(12) United States Patent
Yamada et al.

(10) Patent No.: US 7,770,863 B2
(45) Date of Patent: Aug. 10, 2010

(54) SEAT APPARATUS FOR VEHICLE

(75) Inventors: Yukifumi Yamada, Toyota (JP); Yasuhiro Kojima, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 323 days.

(21) Appl. No.: 11/609,489

(22) Filed: Dec. 12, 2006

(65) Prior Publication Data
US 2007/0145224 A1 Jun. 28, 2007

(30) Foreign Application Priority Data
Dec. 22, 2005 (JP) .............................. 2005-370598

(51) Int. Cl.
*F16M 13/00* (2006.01)
(52) U.S. Cl. .................. 248/429; 248/419; 297/344.15; 296/65.13
(58) Field of Classification Search ................. 248/424, 248/429, 420, 419, 423; 297/344.15, 344.13; 296/65.05, 65.13, 65.14
See application file for complete search history.

(56) References Cited
U.S. PATENT DOCUMENTS 5,083,735 A * 1/1992 Negi et al. .................. 248/429
6,341,819 B1 * 1/2002 Kojima et al. ............... 297/341
7,165,753 B2 * 1/2007 Oh ............................. 248/429
7,303,223 B2 * 12/2007 Nakamura et al. ........ 296/65.15
2002/0179798 A1 * 12/2002 Fuller ......................... 248/429
2007/0108360 A1 * 5/2007 Ito et al. ..................... 248/424

FOREIGN PATENT DOCUMENTS

DE  100 14 823 C 1  8/2001
JP  2000-233671  8/2000

OTHER PUBLICATIONS

Ito et al.'s certified Foreign Priority with early filing date of Nov. 15, 2005.*

* cited by examiner

*Primary Examiner*—A. Joseph Wujciak, III
(74) *Attorney, Agent, or Firm*—Oblon, Spivak, McClelland, Maier & Neustadt, L.L.P.

(57) ABSTRACT

A seat apparatus for a vehicle includes a lower rail fixed to a vehicle floor and an upper rail slidably supported relative to the lower rail and having a U-shaped cross section opened downward. The seat apparatus includes a supporting member integrally formed with a bottom wall portion and fixed, at both longitudinal ends thereof, to an upper portion of the upper rail and a side wall portion extending upward from at least one width directional end of the bottom wall portion. The supporting member supports a vehicle seat. The supporting member includes a curved portion integrally formed at an intermediate portion in the longitudinal direction of the bottom wall portion of the supporting member and curved upward to be distant from the upper rail.

9 Claims, 7 Drawing Sheets

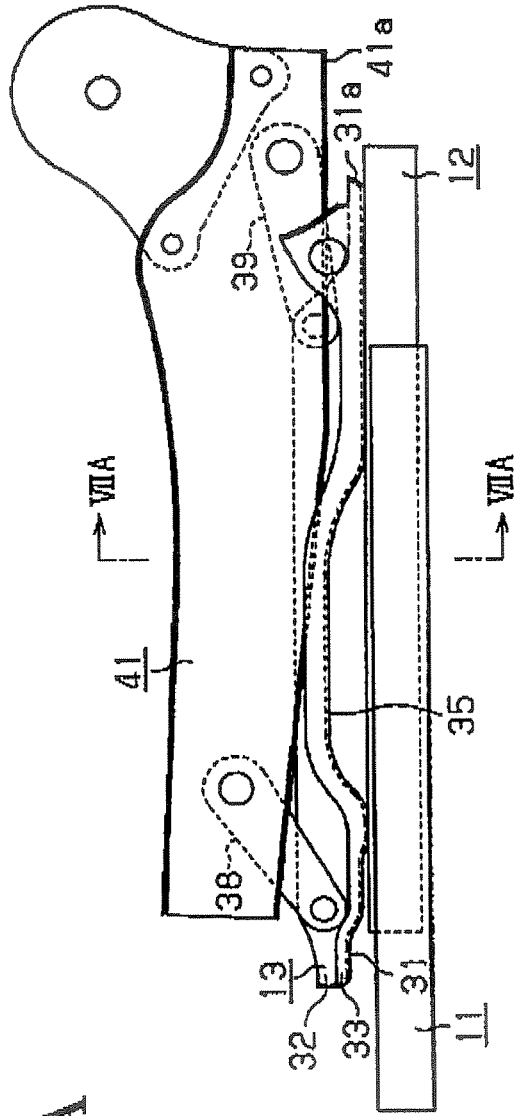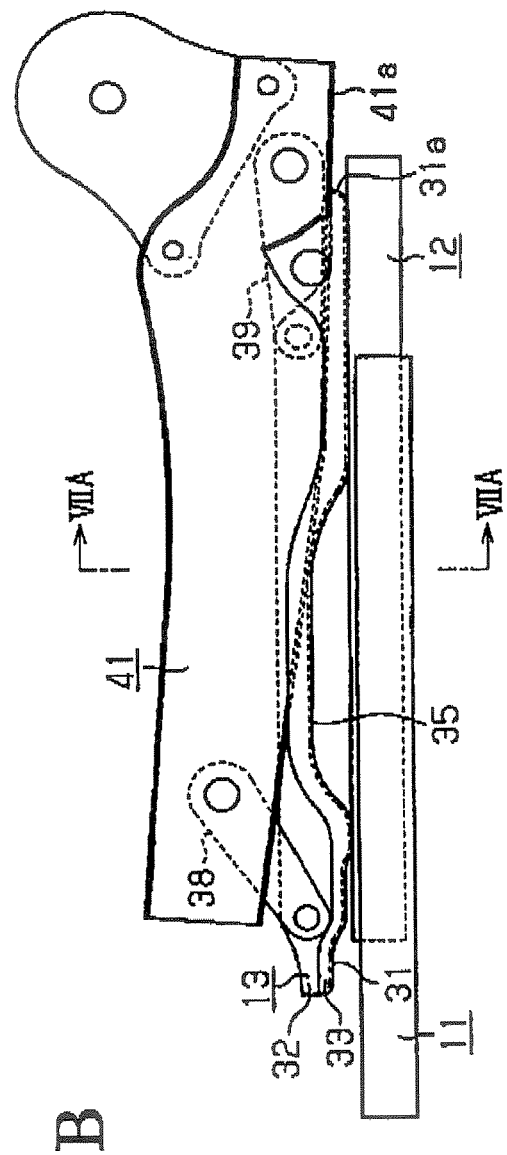

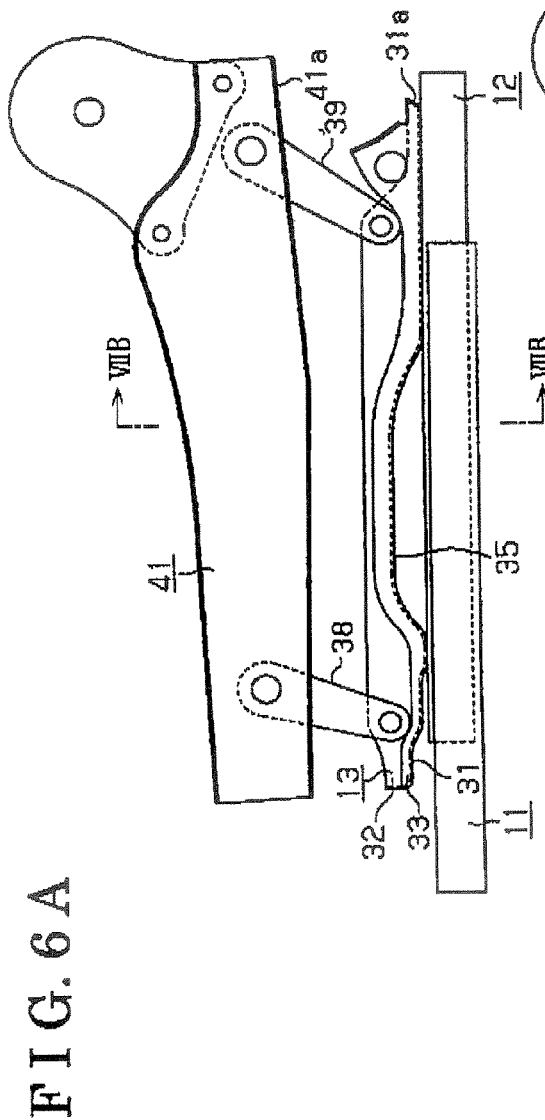
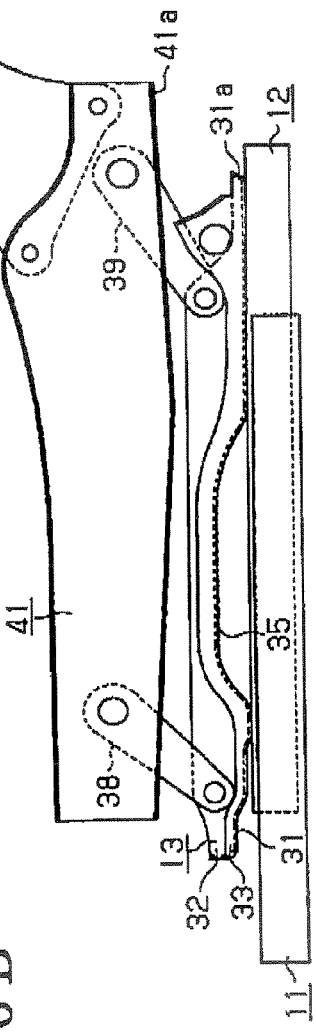
FIG. 6A
FIG. 6B

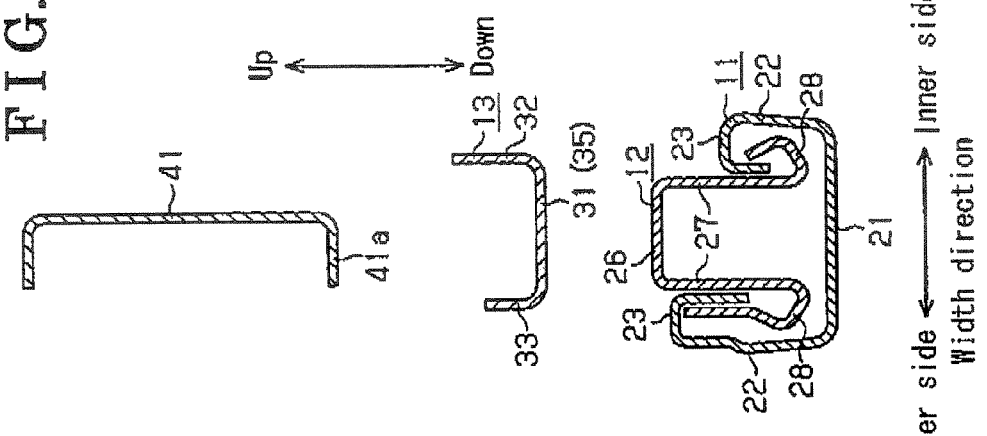
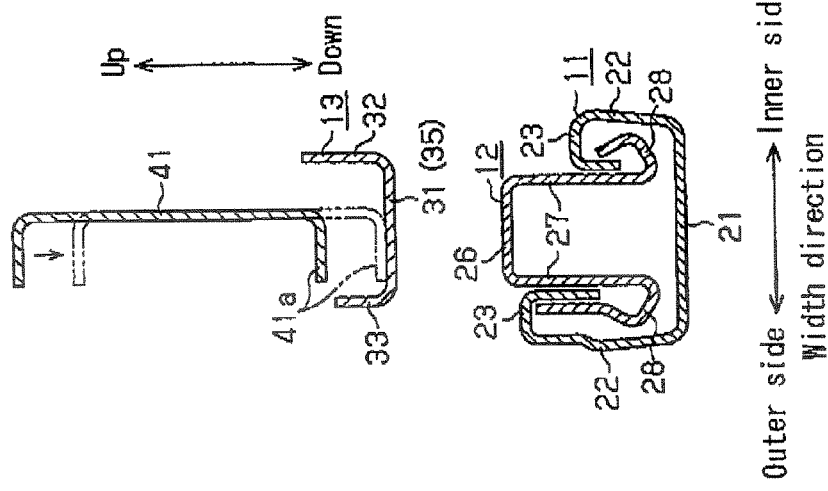

US 7,770,863 B2

SEAT APPARATUS FOR VEHICLE

This application is based on and claims priority under 35 U.S.C. §119 to Japanese Patent Application 2005-370598, filed on Dec. 22, 2005, the entire content of which is incorporated herein by reference.

FIELD OF THE INVENTION

The present invention relates to a seat apparatus for a vehicle.

BACKGROUND

A known seat apparatus for a vehicle is disclosed in German Patent No. 100 14 823 C1. The disclosed seat apparatus for a vehicle includes a function of adjusting a height of a vehicle seat (a seat cushion). At an upper portion of an upper rail, a supporting member is provided to which each end of a pair of links for the adjustment of the height of the vehicle seat is rotatably connected. A parallel link system constituted by means of these links supports an upper structure of the vehicle seat such as a lower arm serving as a framework of the vehicle seat.

According to the seat apparatus disclosed in German Patent No. 100 14 823 C1, no reinforcement member is especially provided to the supporting member, which supports the link and the lower arm, and the like. Therefore, the supporting member may easily be deformed when it is applied with various loads. Further, because the lower arm, or the like, is supported via the link, if a large load is applied to the link because of a collision of the vehicle, for example, the link may be deformed caused by buckling and a height position of the vehicle seat may not be held any more.

In contrast, according to a seat apparatus disclosed in JP2000233671A, a highly rigid frame (21) having a partially closed cross section is connected to an upper portion of an upper rail having a U-shaped cross section opened downward. The frame (21) supports the lower arm, or the like. However, because the major portion of this frame in its cross section is in a closed state, a connecting mechanism and a connecting position of the frame relative to the upper rail may significantly be limited. Further, because of an increase of a cross sectional area of the frame due to its closed cross section, weight of the frame may be increased.

A need thus exists to provide a seat apparatus for a vehicle capable of improving strength for supporting the vehicle seat whereas restricting a limitation to an assembling property.

SUMMARY OF THE INVENTION

According to an aspect of the present invention, a seat apparatus for a vehicle includes a lower rail fixed to a vehicle floor, an upper rail slidably supported relative to the lower rail and having a U-shaped cross section opened downward, a supporting member integrally formed with a bottom wall portion connected, at both longitudinal ends thereof, to an upper portion of the upper rail and a side wall portion extending upward from at least one width directional end of the bottom wall portion and supporting a vehicle seat, and a curved portion formed at an intermediate portion in the longitudinal direction of the bottom wall portion of the supporting member and curved upward to be distant from the upper rail.

BRIEF DESCRIPTION OF THE DRAWINGS

The foregoing and additional features and characteristics of the present invention will become more apparent from the following detailed description considered with reference to the accompanying drawings, wherein:

FIG. 5A is a side view of the seat apparatus for explaining an operation thereof in a condition where a lower arm is supported at a lowermost end position via a forward link and a rearward link.

FIG. 5B is a side view of the seat apparatus for explaining an operation thereof in a condition where the lower arm is lifted downward from the position shown in FIG. 5A.

FIG. 6A is a side view of the seat apparatus for explaining an operation thereof in a condition where the lower arm is supported at a uppermost end position via the forward link and the rearward link.

FIG. 6B is a side view of the seat apparatus for explaining an operation thereof in a condition where the lower arm is lifted downward from the position shown in FIG. 6A.

FIG. 7A is a cross-sectional view taken along line VIIA-VIIA of FIG. 5A and line VIIA-VIIA of FIG. 5B.

FIG. 7B is a cross-sectional view taken along line VIIB-VIIB of FIG. 6A.

DETAILED DESCRIPTION

Figure 1:
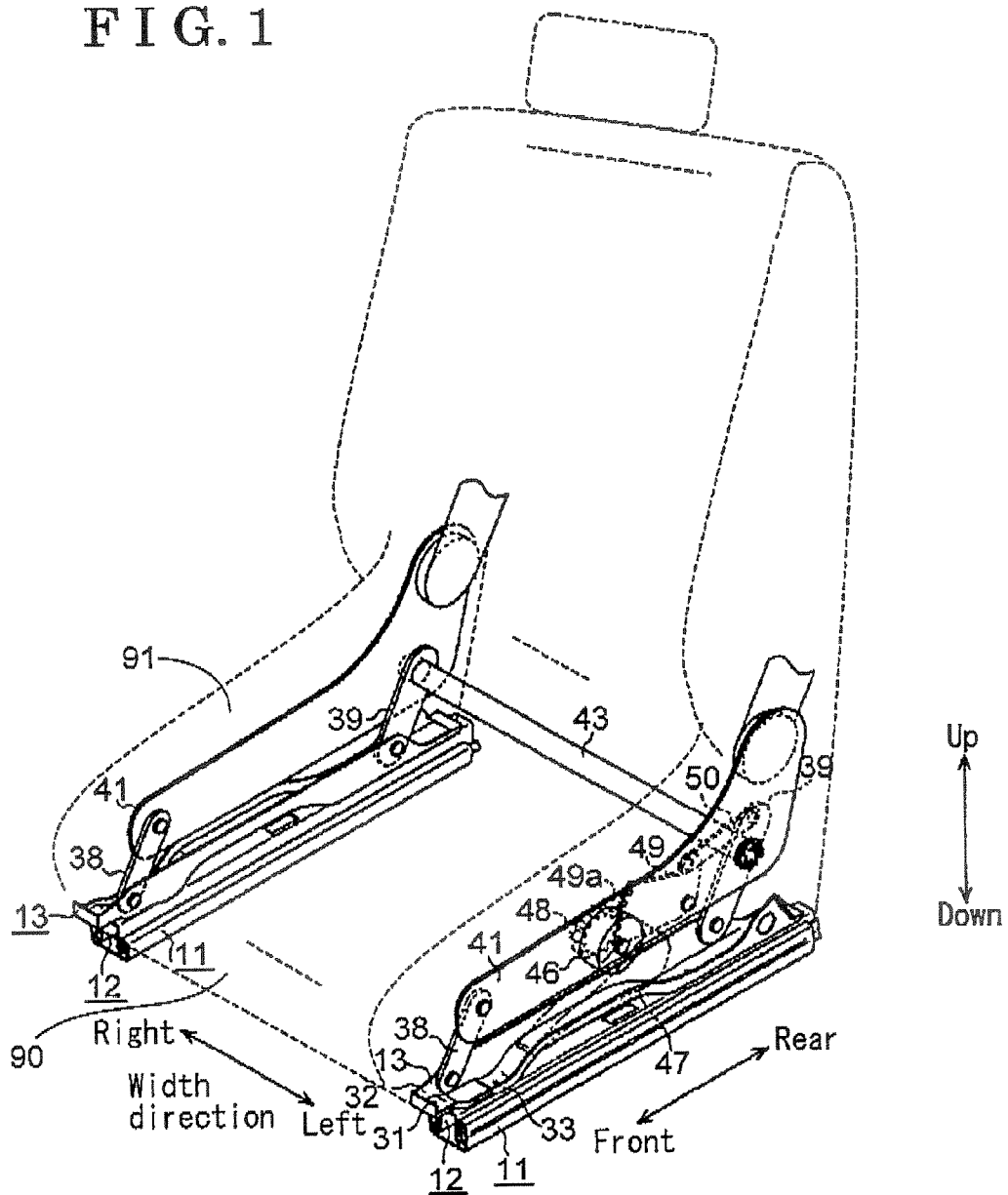
FIG. 1 is a perspective view illustrating a framework portion of a seat apparatus for a vehicle according to an embodiment of the present invention.
Figure 2:
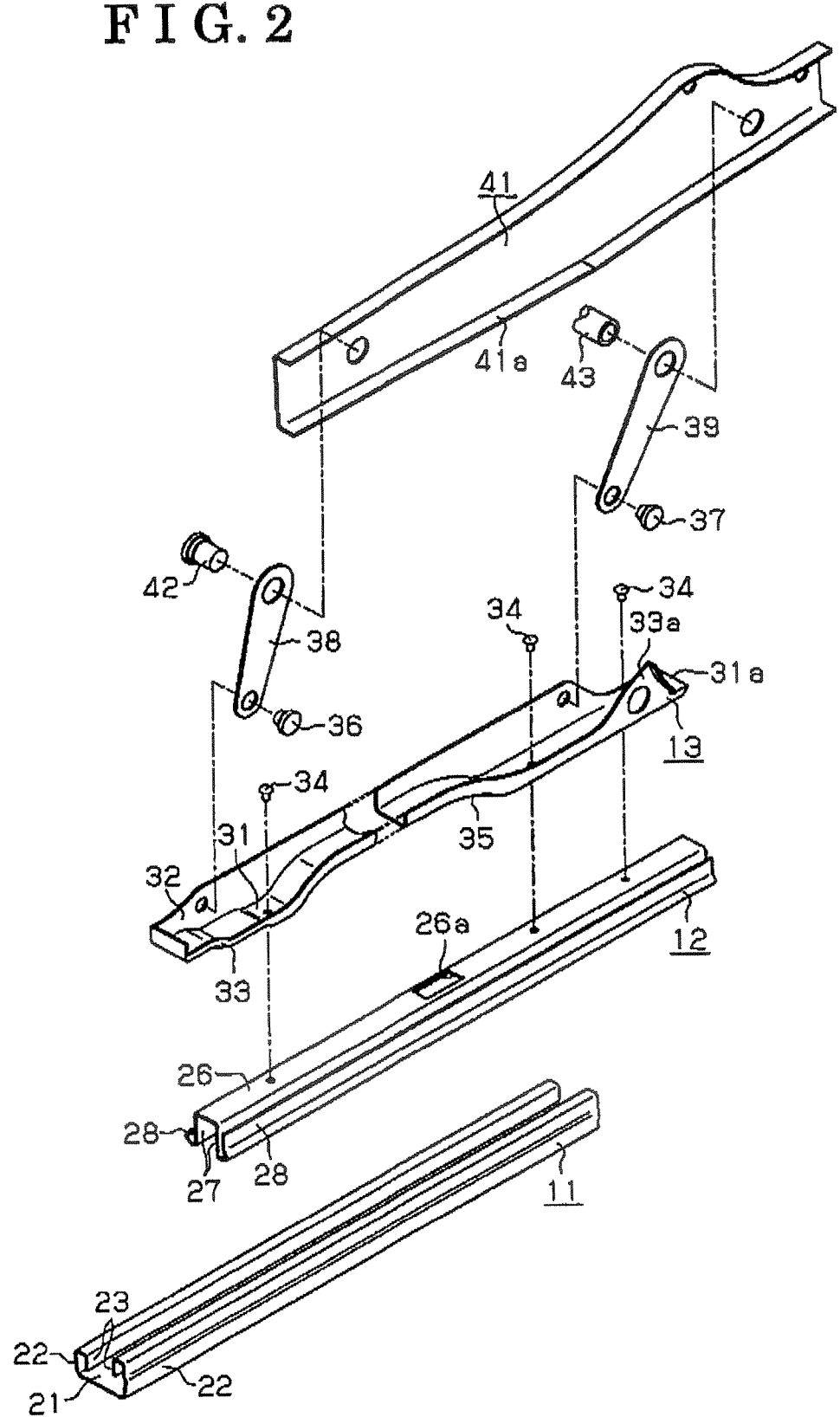
FIG. 2 is an exploded perspective view illustrating the framework portion of the seat apparatus at a left side seen from the front of the seat.

Hereinafter, an embodiment that embodies the present invention will now be described with reference to the drawings. FIG. 1 is a perspective view showing a framework portion of a seat apparatus for a vehicle to be mounted on a vehicle such as an automobile, for example. FIG. 2 is an exploded perspective view showing a framework portion at one side (at a left side seen from a front side of a seat). Because this seat apparatus for a vehicle has a substantial symmetric structure in the seat width direction (in the right and left direction), the same members at the left and right sides will be described by the same reference numbers.

As shown in FIG. 1, a pair of lower rails 11 respectively provided to one side and the other side (at the left side and the right side) in the seat width direction are fixed to a vehicle floor 90 so as to extend in a back and forth direction. As shown in FIG. 2, each lower rail 11 is long extending in the back and forth direction and has a U-shaped cross section opened upward. Each lower rail 11 comprises a bottom wall portion 21, a pair of side wall portions 22 extending upward from both ends in a shorter side (in the leftward and rightward direction) of the bottom wall portion 21, and folded wall portions 23 each extends from an upper end of each side wall portion 22 to be bent inward in a width direction and then further folded toward a base end side of the side wall portion 22.

An upper rail 12 paring in the seat width direction is slidably mounted at an upper side of each lower rail 11 in the back and forth direction. Each upper rail 12 is long extending in the back and forth direction and has a U-shaped cross section opened downward. Each upper rail 12 includes a cover wall portion 26, a pair of side wall portions 27 extending downward from both ends of a shorter side (in the leftward and rightward direction) of the cover wall portion 26, and folded wall portions 28 extending from a lower end of each side wall portion 27 to be bent outward in the width direction and then further turned to be surrounded by the side wall portion 22 and the folded wall portion 23. The upper rail 12 is slidably supported relative to the lower rail 11 in the back and forth direction via sliding members (of which illustration is omitted) each accommodated in a space defined between inner wall surfaces at the both sides in the width direction of the lower rail 11 and surfaces of the upper rail 12 facing therewith.

An intermediate bracket 13 serving as a supporting member made of metal plate and pairing in the seat width direction is fixed at an upper portion of each upper rail 12 so as to extend in the back and forth direction. Each intermediate bracket 13 is long extending in the back and forth direction and has a U-shaped cross section opened upward. The intermediate bracket 13 includes a bottom wall portion 31 extending along the cover wall portion 26, and a pair of side wall portions 32 and 33 extending upward from both ends at a shorter side (in the leftward and rightward direction) of the bottom wall portion 31. Each side wall portion 32 and 33 is respectively located at an inner side and an outer side in the seat width direction, and the length of projection extending upward of the side wall portion 32 is set to be longer than the length of projection of the side wall portion 33. As shown in FIG. 1, the intermediate bracket 13 is mounted on the upper portion (the cover wall portion 26) of the upper rail 12, and is tightened to the cover wall portion 26 of the upper rail 12 at both ends in a longitudinal direction of the bottom wall portion 31 by screws 34.

The bottom wall portion 31 includes a curved portion 35 at its intermediate portion along its longitudinal direction interposed between the forward and rearward screws 34. The curved portion 35 is curved upward to be distant from the upper rail 12. Therefore, the areas of the side wall portions 32 and 33 are reduced at the portions corresponding to the bottom wall portion 31 curved upward by the curved amount. Further, at a rear end of the bottom wall portion 31, a folded portion 31a (i.e., a restriction wall portion) folded upward is formed. Further, at a rear portion of the side wall portion 33, a belt anchor portion 33a serving as a supporting portion is formed projecting upward into the shape of triangle and pivotally supporting a belt buckle of a seat belt.

To each intermediate bracket 13, one end of a forward link 38 and one end of a rearward link 39 pairing up with each other in the back and forth direction are rotatably connected by supporting pins 36 and 37 at both end portions in a longitudinal direction of one of the side wall portions 32. The forward link 38 and the rearward link 39 are butted against the side wall portion 32 from an outside (from a side of the side wall portion 33) in the seat width direction, and are disposed in such a manner that a bottom wall portion 31 is facing with their lower portions.

Further, to the other end of the forward link 38, a front end portion in a longitudinal direction of the long lower arm 41 extending in the back and forth direction is rotatably connected by a support pin 42. To the other end of the rearward link 39, a rear end portion in the longitudinal direction of the lower arm 41 is rotatably connected by a cylindrical torque rod 43 (see FIG. 1). The lower arm 41 is molded from a metal plate and constitutes a framework of a vehicle seat 91 (a seat cushion), and is butted against the forward link 38 and the rearward link 39 from the outside (from the side of the side wall portion 33) in the seat width direction. Therefore, the lower arm 41 is disposed in such a manner that the bottom wall portion 31 is facing with the lower portion of the lower arm 41. The lower arm 41 is formed with a lower end portion 41a curved outward in the seat width direction over its entire longitudinal direction. The lower arm 41 is supported to be movable up and down relative to the intermediate bracket 13 (the upper rail 12) via these forward link 38 and the rearward link 39. The lower arms 41 located at the left and right sides are connected to each other in a bridged state by the torque rod 43 so that they are interlocked with each other to be movable in an up and down direction.

As shown in FIG. 1, a clutch mechanism 46 is mounted to one of the lower arms 41 disposed at one side (at the left side) in the seat width direction. An operational lever 47 is mounted to the clutch mechanism 46, and a pinion gear 48 is provided to an output shaft thereof. The pinion gear 48 is rotated by an operation of the operational lever 47. Further, behind the clutch mechanism 46, a lower portion at a base end side of a sector gear 49 is rotatably supported by the lower arm 41, whereas a tooth portion 49a to be engaged with the pinion gear 48 is formed at the top end portion of the sector gear 49. As the pinion gear 48 rotates, the sector gear 49 rotates. The clutch mechanism 46 permits a rotation of the pinion gear 48 by the operational lever 47, whereas restricts the rotation of the pinion gear 48 due to the sliding movement of the sector gear 49.

An upper portion at the base end side of the sector gear 49 is connected to an upper end portion of one of the rearward link 39 by a drive link 50. The drive link 50 is rotatably connected to the sector gear 49 and the rearward link 39, respectively. Therefore, as the sector gear 49 is rotated, the rearward link 39 is rotated via the drive link 50, and the other rearward link 39 connected via the torque rod 43 is rotated, so that both of the lower arms 41 are interlocked to move in the up and down direction.

Figure 3:
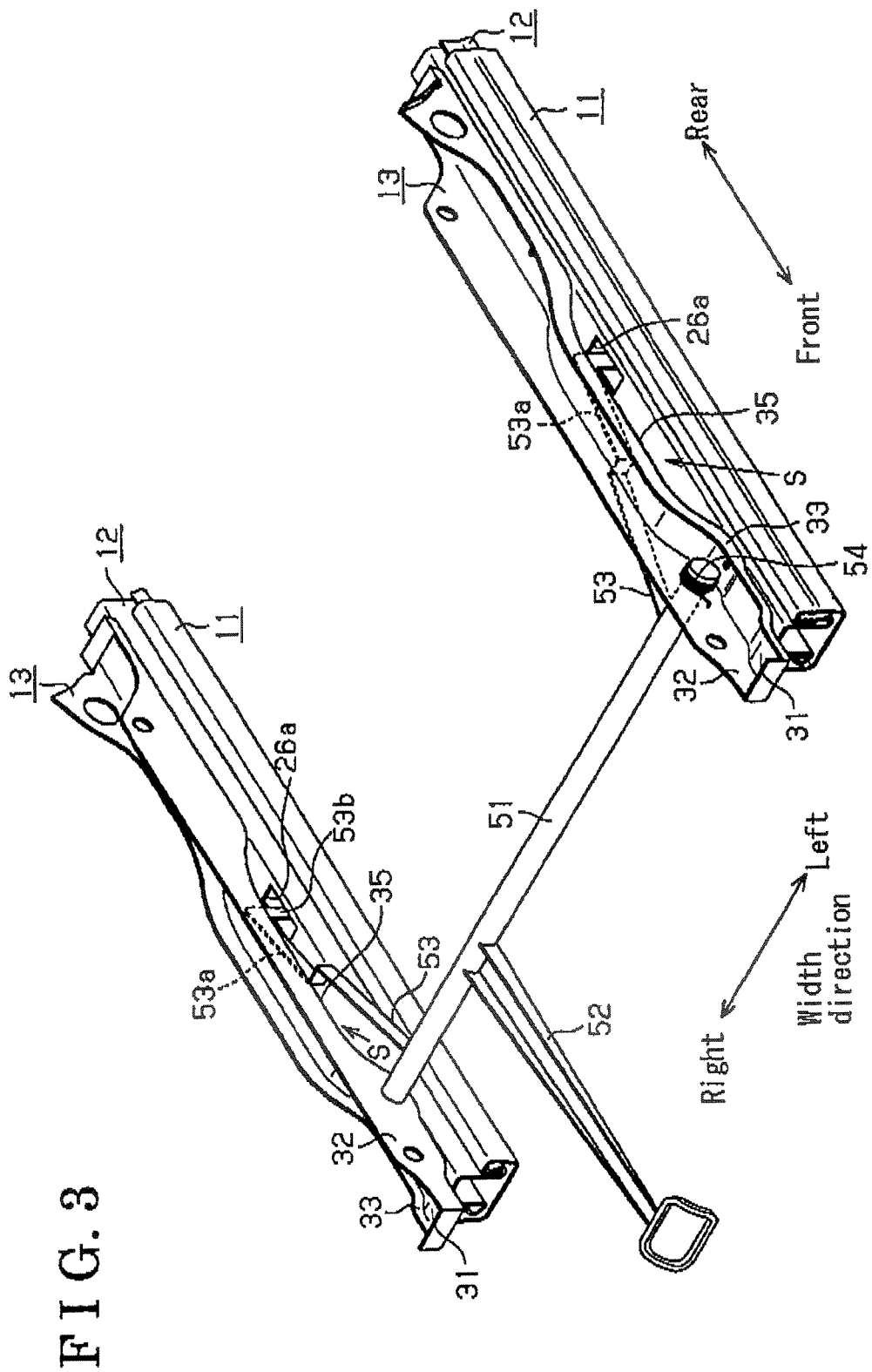
FIG. 3 is a perspective view illustrating the framework portion of the seat apparatus from which an upper structure of an intermediate bracket is omitted.

Next, a restriction of a sliding movement of the upper rail 12 relative to the lower rail 11 and release from the restriction will now be described. FIG. 3 is a perspective view showing a framework portion of a seat apparatus for a vehicle from which illustration of an upper structure of the intermediate bracket 13 is omitted. As shown in FIG. 3, a cylindrical torque rod 51 is rotatably supported at the intermediate bracket 13 at the front side of the curved portion 35 in a state where the cylindrical torque rod 51 bridges between the left and right side wall portions 32. Then, at an intermediate portion in a longitudinal direction of the torque rod 51, a operational lever 52 extending forward is connected so as to rotate integrally.

To the torque rod 51, a pair of release levers 53 each made of metal plate is connected to rotate integrally. The pair of release levers 53 are extending rearward and are adjacent to an inner side in the seat width direction of each intermediate bracket 13. Each release lever 53 includes a tip end portion 53a folded outward into a Z-like zigzag shape in the seat width direction at an intermediate portion in the longitudinal direction. Each tip end portion 53a is disposed by partially utilizing a space S defined between the upper surface of the upper rail 12 (cover wall portion 26) and the curved portion 35. At the tip end portion 53a of the release lever 53, a contact piece 53b is extending downward and is corresponding to a through hole 26a formed on the cover wall portion 26. The contact piece 53b is formed with a cover layer 56 made of resin or rubber to cover the entire surface thereof (see FIG. 4).

Each release lever 53 is biased by a spring 54 of which one end is locked with the end portion at one side (at the left side) in the seat width direction of the torque rod 51. The release lever 53 is biased toward a side where the tip end portion 53a is released from the through hole 26a. At the same time, the release lever 53 comes in contact with a facing surface of the bottom wall portion 31 (the curved portion 35). In this state, the release lever 53 is positioned at a predetermined rotational position.

Figure 4:
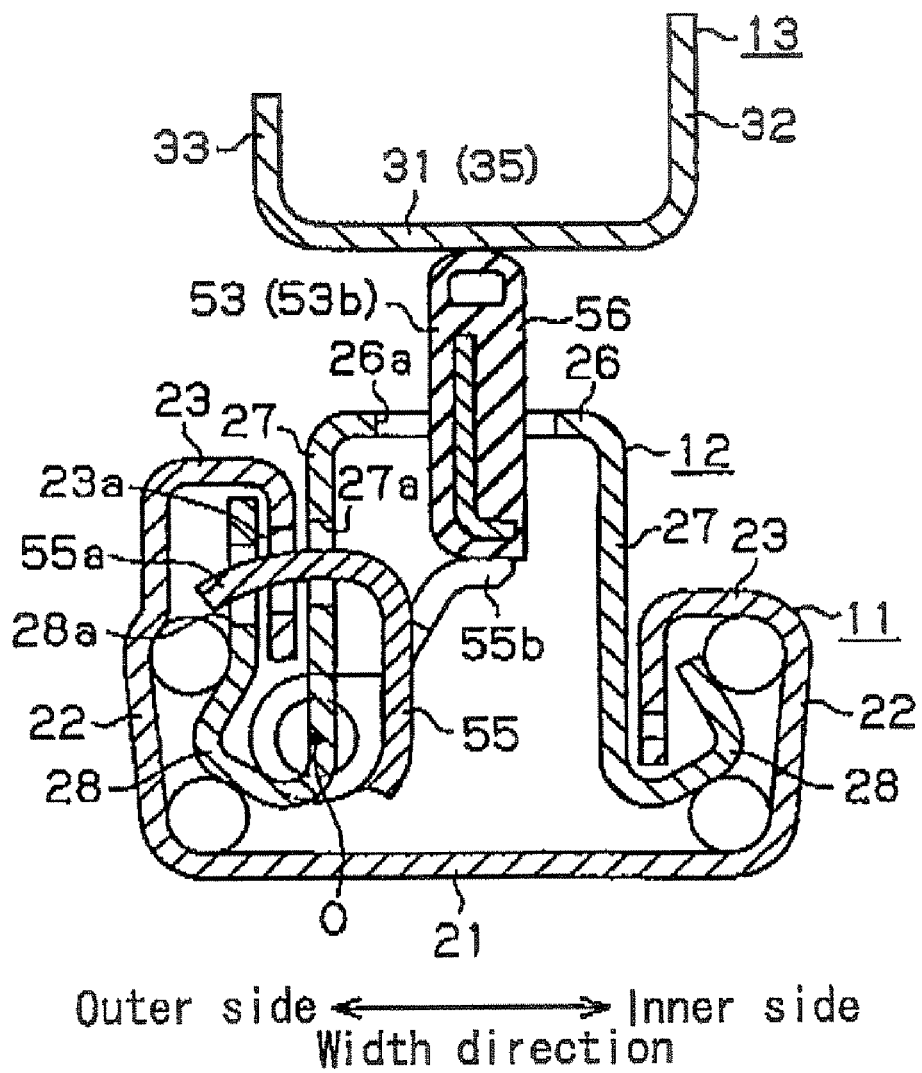
FIG. 4 is a cross-sectional view of the seat apparatus.

As shown in FIG. 4, at an end portion extending downward from the folded wall portion 23, a plurality of lock holes 23a arranged at a predetermined interval in its longitudinal direction is formed. At the side wall portion 27 and the folded wall portion 28 located outside in the seat width direction of the upper rail 12, openings 27a and 28a capable of facing each of the lock holes 23a are respectively formed. On the upper rail 12, a metallic lock lever 55 (i.e., a lock member) rotatably supported about a rotational axis O extending in the longitudinal direction of the upper rail 12 is provided. This lock lever 55 is formed with a lock claw 55a capable of penetrating through the lock hole 23a together with the openings 27a and 28a. The lock lever is further formed with an engagement portion 55b extending under the release lever 53 in such a manner to be located on a rotational trail of the release lever 53 (the cover layer 56). The lock lever 55 is biased toward a counterclockwise direction in FIG. 4 by an unillustrated biasing member, that is, the lock lever 55 is biased toward a side where the lock claw 55a penetrates through the openings 27a, 28a (and the lock hole 23a).

On this occasion, it is needless to say that, in the state shown in FIG. 4 where the lock claw 55a is penetrated through the lock hole 23a together with the openings 27a and 28a, a sliding movement of the upper rail 12 relative to the lower rail 11 is restricted. At this time, the contact piece 53b of the release lever 53 is positioned by being pressed upward by the engagement portion 55b via the cover layer 56 and also by being in contact with the facing surface of the bottom wall portion 31 (the curved portion 35) via the cover layer 56. Then, the lock lever 55 is locked by the bottom wall portion 31 via the release lever 53 (the cover layer 56) so that the rotation thereof is stopped.

When the torque rod 51 is rotated by the operational lever 52 and the contact piece 53b moves down, the lock lever 55 is pressed by the contact piece 53b via the cover layer 56 to rotate in a clockwise direction in FIG. 4, so that the lock claw 55a is withdrawn from the lock hole 23a. As a result, the restriction of the sliding movement of the upper rail 12 relative to the lower rail 11 is released. The contact piece 53b of the release lever 53 comes in contact with the engagement portion 55b or the curved portion 35 via the cover layer 56 in accordance with an operation of the operational lever 52, so that contact between the metallic members is avoided.

Next, an operation of the seat apparatus according to the embodiment of the present invention will be described with reference to FIGS. 5 to 7. As has already been described, the lower arm 41 is disposed in such a manner that the bottom wall portion 31 of the intermediate bracket 13 is facing with the underside of the lower arm 41, and is supported to be movable up and down relative to the intermediate bracket 13 via the forward link 38 and the rearward link 39.

First of all, as shown in FIG. 5A, it is assumed that the lower arm 41 is supported at a lowermost end position via the forward link 38 and the rearward link 39. In this state, it is assumed that a large load is applied caused by a collision of the vehicle, for example, and the lower arm 41 is lifted downward as shown in FIG. 5B. On this occasion, the lower arm 41 comes in contact with the folded portion 31a at the rear end portion of its lower end portion 41a, and thus, its further depression is suppressed. Further, as has been illustrated in FIG. 7A in combination with the cross sectional view taken along the line VIIA-VIIA of FIG. 5A and the line VIIA-VIIA of FIG. 5B respectively, the lower arm 41 comes in contact with the curved portion 35 at its intermediate portion in its longitudinal direction at the lower end portion 41a, and thus, its further depression is suppressed.

FIG. 6A shows a state where the lower arm 41 is supported at an uppermost end position via the forward link 38 and rearward link 39. FIG. 6B shows a state where the lower arm 41 is lifted downward from the position shown in FIG. 6A. Further, FIG. 7B shows a cross-sectional view taken along the line VIIB-VIIB of FIG. 6A.

As described above, according to the embodiment of the present invention, the following effects can be obtained.

According to the embodiment of the present invention, the intermediate bracket 13 that supports the vehicle seat 91 (the lower arm 41) is integrally formed with the bottom wall portion 31 and the side wall portions 32 and 33. At the same time, the intermediate portion in the longitudinal direction of the bottom wall portion 31 is formed with the curved portion 35 curved upward to be distant from the upper rail 12 (the cover wall portion 26). Due to this structure, the rigidity is enhanced and the strength for supporting the vehicle seat 91 is enhanced. Further, even though the intermediate bracket 13 enhances rigidity, its cross section over the entire length in the longitudinal direction is not in a fully closed state. Thus, a limitation to a connecting mechanism and a connecting position of the intermediate bracket 13 relative to the upper portion of the upper rail 12 can be suppressed. Further, since the intermediate portion in the longitudinal direction of the bottom wall portion 31 is curved upward, the areas of the side wall portions 32 and 33 extending upward from the bottom wall portion 31 are reduced by the curved amount. Therefore, weight of the intermediate bracket 13 is reduced and the material for molding the intermediate bracket 13 can be reduced accordingly, and as a result, cost reduction can be achieved.

According to the embodiment of the present invention, even when the large load is applied caused by the collision of the vehicle and the lower arm 41 is lifted downward, the lower arm 41 comes in contact with the curved portion 35 and its further depression is suppressed. As a result, remarkable descent in the height of the vehicle seat 91 can be prevented.

Alternatively, even when the lower arm 41 is lifted downward, the lower arm 41 comes in contact with the folded portion 31a and its further depression can be suppressed. As a result, remarkable descent in the height of the vehicle seat 91 can be prevented.

According to the embodiment of the present invention, even when a large load is applied to the lower arm 41 caused by the collision of the vehicle and the lower arm 41 is dislocated in the width direction (along the shorter side of the bottom wall portion 31), since the lower arm 41 is interposed between the both side wall portions 32 and 33 at the both sides in the width direction, excessive deformation (i.e. buckling) in the width direction of the lower arm 41 can be suppressed. The suppression of the deformation in the width direction of the lower arm 41 is especially effective in the case where the lower arm 41 comes in contact with the intermediate bracket 13 (the bulged portion 35 or the folded portion 31a) which will induce the deformation of the lower arm 41 in the width direction.

According to the embodiment of the present invention, with a seat apparatus for a vehicle having a function of adjusting the height of the vehicle seat 91, the remarkable descent in the height of the vehicle seat 91 can be prevented.

According to the embodiment of the present invention, since the release lever 53 is disposed by partially utilizing the space S defined between the upper rail 12 and the curved portion 35, the occupied space of the entire apparatus can efficiently be used.

According to the embodiment of the present invention, to the portions of the release lever 53 to be in contact with the lock lever 55 (the engagement portion 55b) and the curved portion 35, the cover layer 56 made of resin or rubber is provided. Due to this structure, for example, when the release lever 53 is operated (i.e., when the lock lever 55 is pressed) or released (i.e. when the lock lever 55 come in contact with the curved portion 35), contact between metallic members to cause strange sounds can be prevented.

According to the embodiment of the present invention, the belt buckle of the seat belt is pivotally supported by utilizing the intermediate bracket 13 (side wall portion 33). As a result, the number of parts can be reduced as compared with the case where, for example, another bracket for pivotally supporting the belt buckle is additionally provided.

The foregoing embodiment may be modified as follows.

In the foregoing embodiment, connection between the upper rail 12 and the intermediate bracket 13 is not limited to tightening by the screws 34, but may be alternatively achieved by welding.

Alternatively, or in addition, the cover layer 56 may be provided to the side of the facing surface of the curved portion 35 or to the side of the engagement portion 55b.

Alternatively, or in addition, the intermediate bracket 13 may have a L-shaped cross section from which either one of the side wall portions 32 and 33 has been omitted.

Alternatively, or in addition, the function of adjusting the height of the vehicle seat (an up-and-down function) may be omitted.

According to the embodiment of the present invention, to the portions of the release lever to be in contact with the lock member and the curved portion, the cover layer made of resin or rubber is provided. Due to this structure, for example, when the release lever is operated (i.e., when the lock member is pressed) or released (i.e. when the lock member comes in contact with the curved portion), contact between metallic members to cause strange sounds can be prevented.

According to the embodiment of the present invention, the belt buckle of the seat belt is pivotally supported by utilizing the supporting portion (the side wall portion). As a result, the number of parts can be reduced as compared with the case where, for example, another bracket for pivotally supporting the belt buckle is additionally provided.

According to the embodiment of the present invention, the supporting member for supporting the vehicle seat is integrally formed with the bottom wall portion and the side wall portion. Further, the supporting member is formed with the curved portion curved upward so as to be distant from the upper rail at the intermediate portion in the longitudinal direction of the bottom wall portion. Due to this structure, the rigidity of the supporting member is enhanced. In other words, if it is assumed that mass of the members used for the seat apparatus is at the similar level, a secondary moment of the cross section about a shaft extending in the right and left direction of the vehicle can be increased. Therefore, strength in supporting the vehicle seat can be improved. Further, even though the supporting member enhances rigidity, its cross section over the entire length in the longitudinal direction is not in a fully closed state. Thus, a limitation to a connecting mechanism and a connecting position of the supporting member relative to the upper portion of the upper rail can be suppressed.

According to the embodiment of the present invention, even when the large load is applied caused by the collision of the vehicle and the lower arm is lifted downward, the lower arm comes in contact with the curved portion or the restriction wall portion and its further depression is suppressed. As a result, remarkable descent in the height of the vehicle seat can be prevented.

According to the embodiment of the present invention, even when the large load is applied to the lower arm caused by the collision of the vehicle and the lower arm is dislocated in the width direction (along the shorter side of the bottom wall portion), since the lower arm is interposed between the both side wall portions at the both sides in the width direction, excessive deformation (i.e. buckling) in the width direction of the lower arm can be suppressed.

According to the embodiment of the present invention, since the release lever is disposed by partially utilizing the space defined between the upper rail and the curved portion, the occupied space of the entire apparatus can efficiently be used.

With the configuration of the seat apparatus for a vehicle according to the embodiment of the present invention, the strength for supporting the vehicle seat can be improved whereas restricting the limitation to the assembling property.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
a lower rail fixed to a vehicle floor;
an upper rail slidably supported relative to the lower rail and having a U-shaped cross section opened downward;
a supporting member integrally formed with a bottom wall portion fixed, at both longitudinal ends thereof, to an upper portion of the upper rail and a side wall portion extending upward from at least one width directional end of the bottom wall portion and supporting a vehicle seat;
a curved portion integrally formed at an intermediate portion in the longitudinal direction of the bottom wall portion of the supporting member and curved upward to be distant from the upper rail; and
a lower arm directly or indirectly connected, via links, to the side wall portion of the supporting member at an upper side of the bottom wall portion of the supporting member and forming a framework of the vehicle seat, wherein the lower arm comes in contact with the supporting member at the curved portion when the lower arm is moved downward,
wherein the links connect the lower arm to the supporting member and allow the lower arm to contact the supporting member at the curved portion when the links are moved downward.

2. The seat apparatus for a vehicle according to claim 1, wherein the side wall portion of the supporting member extends upward from both width directional ends of the bottom wall portion.

3. The seat apparatus for a vehicle according to claim 2, wherein the links are for adjusting a height of the vehicle seat.

4. The seat apparatus for a vehicle according to claim 2, further comprising a release lever disposed in a space defined between the upper rail and the curved portion of the supporting member for releasing a restriction of a sliding movement of the upper rail relative to the lower rail.

5. The seat apparatus for a vehicle according to claim 1, wherein the links are for adjusting a height of the vehicle seat.

6. The seat apparatus for a vehicle according to claim 1, further comprising a release lever disposed in a space defined between the upper rail and the curved portion of the supporting member for releasing a restriction of a sliding movement of the upper rail relative to the lower rail.

7. A seat apparatus for a vehicle, comprising:

a lower rail fixed to a vehicle floor;

an upper rail slidably supported relative to the lower rail and having a U-shaped cross section opened downward;

a supporting member integrally formed with a bottom wall portion fixed, at both longitudinal ends thereof, to an upper portion of the upper rail and a side wall portion extending upward from at least one width directional end of the bottom wall portion and supporting a vehicle seat;

a curved portion integrally formed at an intermediate portion in the longitudinal direction of the bottom wall portion of the supporting member and curved upward to be distant from the upper rail; and a release lever disposed in a space defined between the upper rail and the curved portion of the supporting member for releasing a restriction of a sliding movement of the upper rail relative to the lower rail, the seat apparatus further comprising a lock member provided at the upper rail for restricting the sliding movement of the upper rail relative to the lower rail, wherein the release lever releases the restriction of the sliding movement of the upper rail relative to the lower rail by pressing the lock member, a position of the release lever is restricted by being in contact with the curved portion of the supporting member when the release lever is separated from the lock member, and wherein a cover layer made of resin or rubber is provided to a portion of the release lever to be in contact with the lock member and the curved portion.

8. A seat apparatus for a vehicle, comprising:

a lower rail fixed to a vehicle floor;

an upper rail slidably supported relative to the lower rail and having a U-shaped cross section opened downward;

a supporting member integrally formed with a bottom wall portion fixed, at both longitudinal ends thereof, to an upper portion of the upper rail and side wall portions extending upward from at least one width directional end of the bottom wall portion and supporting a vehicle seat; and a curved portion integrally formed at an intermediate portion in the longitudinal direction of the bottom wall portion of the supporting member and curved upward to be distant from the upper rail, wherein the side wall portions define a U shape facing away from the upper rail, and one of the side wall portions of the U shape extends outward from the upper rail farther than another side wall portion of the U shape.

9. A seat apparatus for a vehicle, comprising:

a lower rail fixed to a vehicle floor;

an upper rail slidably supported relative to the lower rail and having a U-shaped cross section opened downward;

a supporting member integrally formed with a bottom wall portion fixed, at both longitudinal ends thereof, to an upper portion of the upper rail and a side wall portion extending upward from at least one width directional end of the bottom wall portion and supporting a vehicle seat;

a curved portion integrally formed at an intermediate portion in the longitudinal direction of the bottom wall portion of the supporting member and curved upward to be distant from the upper rail; and a release lever disposed in a space defined between the upper rail and the curved portion of the supporting member for releasing a restriction of a sliding movement of the upper rail relative to the lower rail, wherein the release lever is disposed in a space defined between the upper surface of the upper rail and the curved portion of the supporting member.

* * * * *